March 13, 1928.  J. C. KAHLE  1,662,502
PITMAN CONNECTION
Filed Dec. 3, 1924
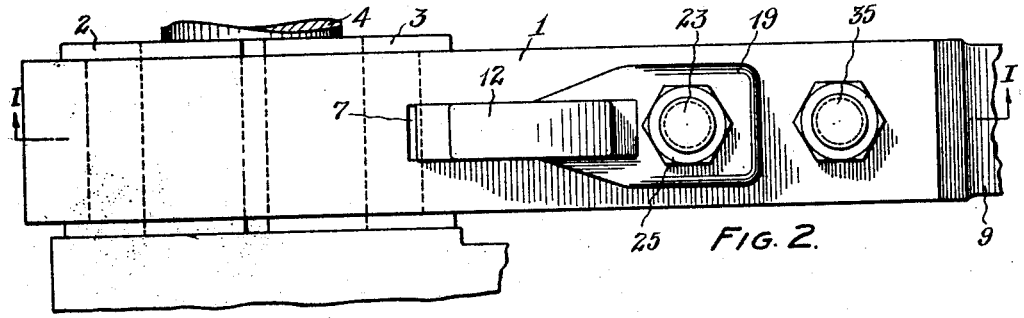
FIG. 2.
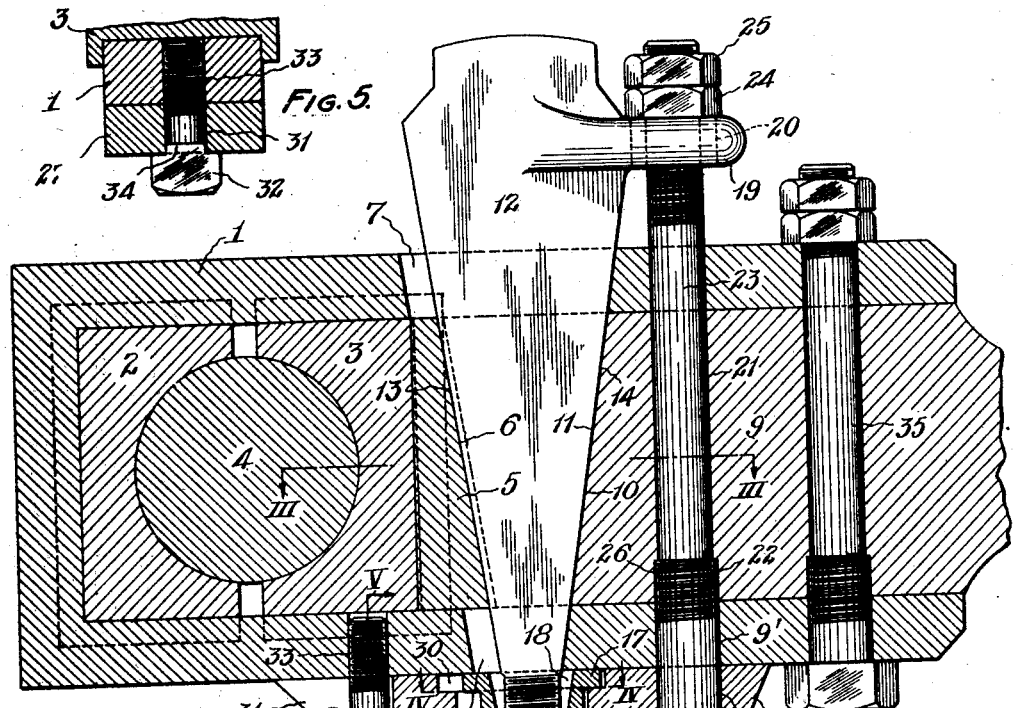
FIG. 5.
FIG. 1.
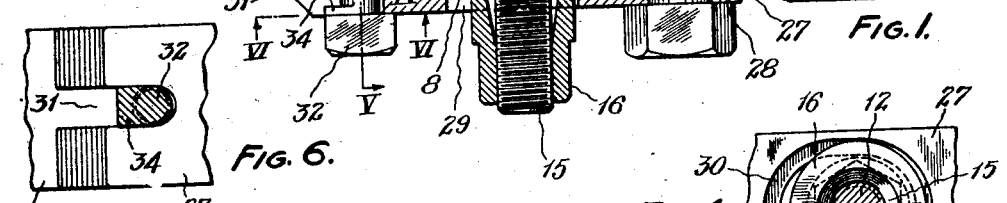
FIG. 6.
FIG. 4.
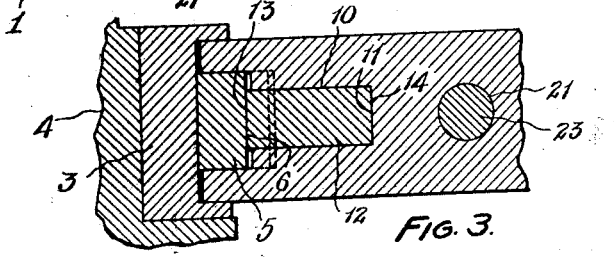
FIG. 3.
INVENTOR:
JAMES C. KAHLE
BY
ATTORNEY Patented Mar. 13, 1928.

1,662,502

UNITED STATES PATENT OFFICE.

JAMES C. KAHLE, OF ERIE, PENNSYLVANIA.

PITMAN CONNECTION.

Application filed December 3, 1924. Serial No. 753,647.

My invention relates to pitman connections whereby a pitman may be connected with a wrist-pin and the necessary adjustment of the parts in such connection effected.

The object of the invention is to provide such a connection whereby said adjustment may be readily and accurately made and whereby the adjusted parts may be securely locked in place.

Said invention consists of means hereinafter fully described and particularly set forth in the claims.

The annexed drawing and the following description set forth in detail certain means embodying my invention, the disclosed means, however, constituting but one of various mechanical forms in which the principle of the invention may be employed.

In said annexed drawing:

Figure 1 represents a longitudinal section of the end of a pitman embodying my invention showing also the wrist-pin to which it is connected, in section, parts being shown in elevation.

Fig. 2 represents a plan of said connection.

Fig. 3 represents a section taken upon the plane indicated by line III—III in Fig. 1.

Fig. 4 represents a section taken upon the plane indicated by line IV—IV in Fig. 1.

Fig. 5 represents a section taken upon the plane indicated by line V—V in Fig. 1.

Fig. 6 represents a detail section taken upon the plane indicated by line VI—VI, Fig. 1, and looking in the direction indicated by the arrows.

The illustrated embodiment of my invention comprises the usual pitman strap 1, in the end of which are mounted two movable bearing blocks 2 and 3, the inner block 3 being slidable so as to be capable of adjustment on the wrist-pin 4. Bearing against the inner edge of the block 3 is a secondary block 5 having a tapered surface 6.

The upper part of the pitman is provided with an aperture 7 and the lower part with an aperture 8, these apertures having tapered sides as shown and the upper being of greater longitudinal dimension than the lower. The connecting rod or main portion 9 of the pitman is provided with a slot 10 having the inner tapered surface 11. Passing through the apertures 7 and 8 is a key 12 having the two oppositely disposed tapered surfaces 13 and 14 corresponding in inclination with the tapered surfaces 6 and 11 respectively. The dimensions of the apertures 7 and 8 are made such that the key may pass through the structure and a free space for longitudinal adjustment provided as is shown in Fig. 1.

It will therefore be seen that by moving the key downwardly while in engagement with the tapered surfaces 6 and 11, the block 5 may be moved toward the wrist-pin, and cause the bearing block 3 to become properly adjusted with relation thereto. By giving the double taper to the key, it will be seen that the latter need only be moved one-half the distance required for any given adjustment that would be necessary if the key had but a single taper as is common practice.

The lower end of the key is provided with the right handed thread 15 which is engaged by a nut 16 formed with an upper flange 17 engaging the lower surface of the strap. The upper portion of the bore of the nut is provided with a tapered portion 18 adapted to receive the lower tapered portion of the key. By turning the nut clockwise, it will therefore be seen that the key may be drawn downwardly to effect the required adjustment of the bearing block 3.

The upper portion of the key is provided with a lateral extension 19 formed with a longitudinally elongated hole 20, and the strap and body portion 9 of the pitman is provided with a bore 21, the lower portion of the body part of which is threaded as at 22. Passing through the bore 21 and hole 20 is a bolt 23, the upper part of which is threaded and is engaged by a nut 24 and lock-nut 25. The lower portion of this bolt is also threaded as at 26, which thread engages the threaded portion 22 of the bore 21. The lower portion 9' of the bore 21 is smooth.

A plate 27 abuts the lower surface of the strap and is provided with a bore 28 through which the bolt 23 also passes, the head of the bolt engaging the lower surface of said plate as shown in Fig. 1. This plate is furthermore provided with an enlarged aperture 29 having a still further enlarged upper portion 30. The flange 17 is of greater dimensions than the lower part of the aperture 29 and the upper part 30 of said aperture is of a depth substantially equal to the thickness of said flange. The plate therefore holds the flange 17 up against the lower portion of the strap, while permitting nut 16 to turn.

The forward portion of plate 27 is formed with an open-ended slot 31 through which passes a cap-screw 32 engaging a threaded hole 33 formed in the strap. This cap-screw is formed with a rectangular boss 34, Figs. 5 and 6, which enters this slot and therefore prevents the cap-screw from turning.

It will therefore be seen that the plate is held securely in place and that by turning the nut 16 in an anti-clockwise direction, the key may be backed off from the engaging parts, when the nuts 24 and 25 are loosened or removed.

The enlarged construction of the aperture 29 permits lateral movement (as viewed in the drawing) of the nut when a lateral movement is imparted to the key during adjustment.

It will be seen from the above described construction that locking bolt 23 holds the key securely in place, thus supplementing the locking action of the nut 16 and making its locking action independent of the locking action of the nut. The plate 27 is held securely in place by the bolt 23 and by the cap-screw 32. The boss 34 of this cap-screw prevents the latter from turning and hence from being removed and allowing the cap-screw to become loose.

In order to disassemble the above-described construction, the nuts 24 and 25 are first removed, whereupon the bolt 23 is unscrewed from its connection with the body portion of the pitman and removed. The nut 16 is then unscrewed from its engagement with the key 12 whereupon the latter may be removed. The fastening bolt 35 which is usually provided is then removed, whereupon the plate 27 carrying the nut 16 may be slid backwardly so as to disengage the cap-screw 32, the fit between the head of the cap-screw and the bottom surface of the strap being sliding but snug.

To assemble the parts, the reverse of the above-described steps is adopted, all as will be readily understood.

As a result of the above described construction, I obtain a pitman adjustment which may be readily and easily effected and by means of parts which are securely held in position against dislocation and which will hence retain the given adjustment indefinitely.

What I claim is:

1. In a device of the character described, the combination of a connecting rod; a pitman strap fixed in relation thereto; bearing blocks mounted in said strap, one of which is slidable; a transversely positioned tapered key adapted to impart movement to said slidable block; the smaller end of said key being threaded and projecting beyond said strap; a nut engaging said thread and abutting said strap; a plate provided with an opening through which said nut projects, lying against said strap, and adapted to lock said nut in place while permitting rotative movement to be imparted thereto; said plate being provided with an end slot; and a cap-screw engaging said strap and passing through said slot; said screw being provided with a boss engaging said slot and adapted to prevent rotative movement of said screw.

2. In a device of the character described, the combination of a pitman; a pitman-strap fixed in relation to the latter; bearing blocks mounted in said strap; a wrist-pin journaled in said blocks; a wedge passing through said strap and between the pitman end and one of said blocks; a nut on one end of said wedge mounted so as to be capable of moving said wedge in both its longitudinal directions; and locking means consisting of a bolt passing through said strap and pitman end and engaging the other end of said wedge.

3. Adjusting means for the bearing block of a pitman end and which consists of a wedge passing transversely through said pitman end; a nut on the end of said wedge and engaging the pitman strap; a plate fixed to the latter and adapted to hold said nut in place while permitting rotative movement thereof, whereby said nut may impart movement to the wedge in both its longitudinal directions; and means independent of said nut for locking said wedge, consisting of a bolt passing through the pitman end and securable to a lateral extension formed on the other end of said wedge, said bolt being positioned laterally of said wedge.

Signed by me this 17 day of November, 1924.

JAMES C. KAHLE.